April 26, 1955
O. FISCHINGER
2,707,103
DEVICE FOR PRODUCING LIGHT EFFECTS
Filed Sept. 1, 1950
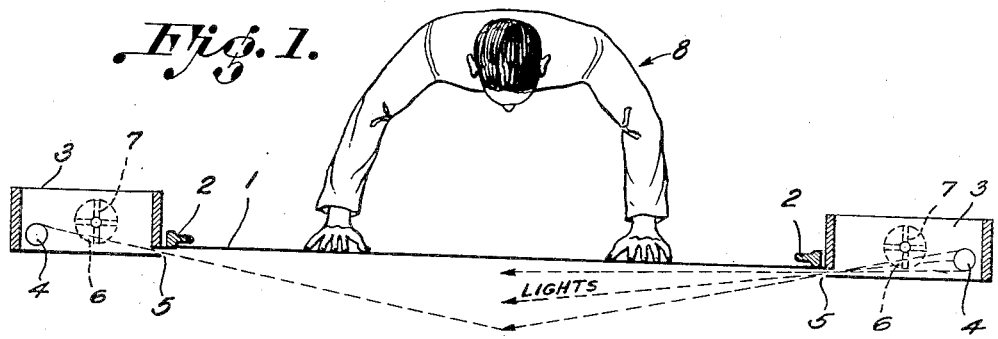
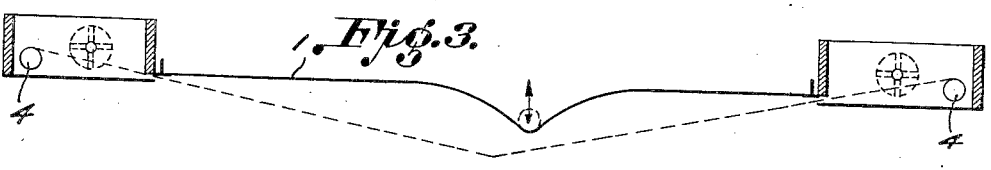
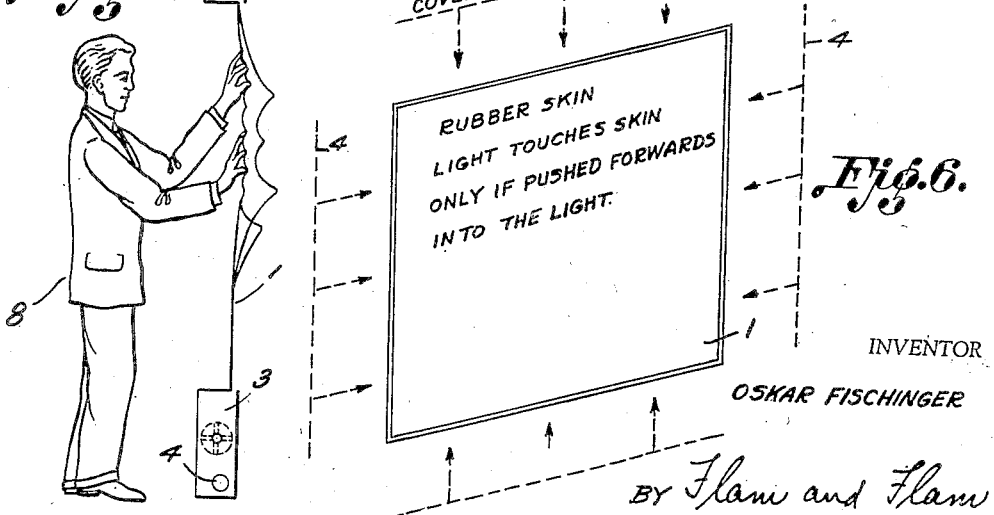
INVENTOR
OSKAR FISCHINGER
BY Flam and Flam
ATTORNEYS _United States Patent Office_

2,707,103
Patented Apr. 26, 1955

2,707,103

DEVICE FOR PRODUCING LIGHT EFFECTS

Oskar Fischinger, Los Angeles, Calif.

Application September 1, 1950, Serial No. 182,669

8 Claims. (Cl. 272—10)

This invention relates to an instrument that utilizes light for producing artistic effects. Such instruments may be used, for example, for public performances, as in theatres, or for reproduction by the aid of television, or motion pictures.

It is one of the objects of this invention to provide an instrument that is capable of expressing artistic ideas by the aid of light, either colored or otherwise.

It is another object of this invention to make it possible for a performer to produce, in proper succession and in accordance with his desires, a succession of luminous effects caused by the casting of light on a continually changing succession of prominences or protuberances. In order to produce the desired effects, the protuberances are made to project from a substantially plane surface; and one or more sources of light are directed to produce rays substantially parallel with the plane from which the protuberances rise, or at a slight angle thereto.

It is still another object of this invention to provide an instrument of the character described that permits the performer great latitude in expressing artistic ideas or impressions by the aid of light and shadow, such as may be produced by contrast between colors.

It is still another object of this device to combine the effects of light and sound, and to produce both effects by the same instrumentality.

Referring to the drawings:

Figure 1 is a horizontal, sectional view of an apparatus illustrating one form of the invention;

Figs. 2, 3, and 4 are diagrammatic views, similar to Fig. 1, illustrating the manner in which protuberances may be produced;

Fig. 5 is a vertical section of the apparatus shown in Fig. 1; and

Fig. 6 is a diagram illustrating the principles of the invention.

The important feature of the invention is the use of a taut, flexible element 1 that is preferably of rubber or other elastic material. However, thin fabric of non-elastic material could also be used. For example, a multiplicity of layers of fabric could be utilized. Furthermore, the visible surface of element 1 may be painted in a single color or a multitude of colors; and the paint may be either fluorescent or may include fine reflecting crystals. Alternatively, infra-red or ultra-violet light may be used to stimulate the fluorescent paint. Furthermore, the element may be either wholly or partially transparent.

The element or membrane 1 can be held in the stretched condition by the aid of an appropriate frame structure 2 provided adjacent the edges of the membrane 1. The membrane 1 can, of course, take any desired form. In the present instance, a rectangular form is illustrated, but the invention is not confined to that shape.

Adjacent each of the edges of the frame structure 2 is an enclosure 3. Thus, four such enclosures may be utilized, corresponding to the four sides of the rectangle. In each of these enclosures, a source of light 4 is provided, adapted to project rays through a narrow slit 5. Accordingly, the light emanating from the slits 5 projects in a direction substantially parallel with the plane of the membrane 1, or only at a slight angle thereto. The sources of light may be movable, and may be artificial or natural. They are capable of being controlled as desired, as by switches or shutters. One way to control the color or character of the light is by the aid of adjustable or movable filters.

For this purpose, there is interposed in the beam of light a color wheel 6. Such a color wheel is located in each of the enclosures 3, for intercepting the light from the source 4. It may include a series of filter arms 7, each having areas of different colors. Thus, when the light passes through any one of the filters 7, the filter 7 may produce a plurality of colors. The filter areas may be arranged at different radial distances from the axis of the wheel to produce thin, superposed layers of light of different colors close to the plane surface of element 1.

In order to utilize the instrument, protuberances may be formed in the membrane 1, as by a performer 8. Thus, as shown in Figs. 2, 3, and 4, protuberances are formed of various heights and in various locations on the membrane 1. There are usually a multiplicity of such protuberances. These protuberances may be produced by any appropriate part of the human body, such as the elbows, feet, hands, or fingers; or the performer may project his entire body into the membrane 1. Likewise, he may utilize especially formed implements for producing specific types of protuberances. As the membrane is struck, sounds due to the vibration, therefore, are also produced.

As the wheels 6 rotate, the lights cast upon the protuberances change. Furthermore, since the filter 7 can be arranged to produce a series of different layers of light substantially parallel to the membrane 1, the heights of the protuberances determine the variety and number of colors cast upon them by these sources of light. Furthermore, the performer 8 can operate switches for the control of the light sources 4; and any desired projection of images or light can be cast upon the membrane 1 by an appropriate film projector.

It is obvious that, by the aid of this instrument, a performer can produce startling effects capable of utilization for many purposes, such as advertising, or the like. Great freedom of expression is permitted, since the rubber or elastic medium 1 can be made as large as possible, making it practicable for a plurality of performers to utilize the same instrument. Of course, any arrangement of a plurality of these instruments may be utilized in different angular relations to each other; and mirrors can also be provided, if desired, for permitting the performer to view his performance, or for multiplying the effects of a single member 1.

The production of the protuberances may be achieved mechanically; in fact, instead of protuberances, hollows or recesses may be formed, as by air pressure, or by magnetic means. The protuberances form cone-like reflecting surfaces. The performer may also be accompanied by music. A recording of the unusual and striking light effects may be obtained by photographing the element from the side and, in fact, the contour of these protuberances, viewed from the side or front, may be recorded on a sound track to provide a new form of synthetic music.

Ordinarily, the audience or viewers would be located on one side of the membrane or element 1, and the performer 8 would be on the other side of the membrane or element 1. However, the audience may, of course, be located in such position as to view the protuberances at an angle, instead of directly from the front.

By the term "coating capable of fluorescing," it is meant any material that can be excited to luminescence by light radiations.

The inventor claims:

1. In combination: a normally plane, flexible member capable of distortion out of said plane; a frame upon which the member is stretched; and means for casting light radiations from one or more edges of the member, said light radiations from the edge or edges forming a beam or beams making a small angle with the plane of the member, and adjacent the surface of said member, the light beam or beams being so positioned as to be intercepted by the flexible member when distorted out of its normal plane.

2. In combination: a normally plane, flexible member capable of distortion out of said plane; a frame upon which the member is stretched; means for casting light raditions from one or more edges of the member, said light radiations from the edge or edges forming a beam or beams making a small angle with the plane of the member. and adjacent the surface of said member, the light beam or beams being so positioned as to be intercepted by the flexible member when distorted out of its normal plane; and means for varying the character of the light radiations.

3. In combination: a frame; a flexible normally plane member stretched by the frame; sources of light adjacent at least some of the edges of said member; and an enclosure for each source providing a slit near the surface of the member, said slit casting a beam adjacent the plane of said member, and so positioned as to be intercepted by the flexible member when the flexible member is distorted out of said plane.

4. In combination: a frame; a flexible normally plane member stretched by the frame; sources of light adjacent at least some of the edges of said member; an enclosure for each source providing a slit near the surface of the member, said slit casting a beam adjacent the plane of said member; and so positioned as to be intercepted by the flexible member when the flexible member is distorted out of said plane, and a changeable color filter interposed between the source and the slit.

5. The combination as set forth in claim 3, with the addition of a fluorescent layer on the member.

6. The combination as set forth in claim 4, with the addition of a fluorescent layer on the member.

7. In combination: a normally plane, flexible member capable of distortion out of the plane of the member; a frame upon which the member is stretched; and means for casting beams of light from the edges of the frame and close to, but not received on, said normally plane surface, and so positioned as to be intercepted by the flexible member when said flexible member is distorted out of the normal plane of said flexible member.

8. In combination: a normally plane, flexible member capable of distortion out of the plane of the member; a frame upon which the member is stretched; and means for casting a plurality of layers of light beams of different colors close to, but spaced from, the normally plane surface, and so positioned as to be intercepted by the flexible member when said flexible member is distorted out of the normal plane of said flexible member.

References Cited in the file of this patent

UNITED STATES PATENTS

| | | |
|---|---|---|
| 613,703 | Mellinger | Nov. 8, 1898 |
| 830,834 | Hudson | Sept. 11, 1906 |
| 1,140,418 | Talke | May 25, 1915 |
| 1,164,816 | Huston | Dec. 21, 1915 |
| 1,480,375 | Cristadoro | Jan. 8, 1924 |
| 1,698,178 | Van Deventer | Jan. 8, 1929 |
| 2,196,423 | Musaphia | Apr. 9, 1940 |
| 2,212,642 | Jackson | Aug. 27, 1940 |

FOREIGN PATENTS

| | | |
|---|---|---|
| 217,158 | Great Britain | 1924 |